United States Patent [19]

Stephenson, Jr.

[11] Patent Number: 5,267,236
[45] Date of Patent: Nov. 30, 1993

[54] ASYNCHRONOUS PARALLEL DATA FORMATTER

[75] Inventor: William H. Stephenson, Jr., Raleigh, N.C.

[73] Assignee: Alcatel Network Systems, Inc., Richardson, Tex.

[21] Appl. No.: 808,524

[22] Filed: Dec. 16, 1991

[51] Int. Cl.⁵ .................................................. H04J 3/22
[52] U.S. Cl. ...................................... 370/84; 370/94.2; 370/102
[58] Field of Search ............... 370/41.43, 47–49, 370/84, 94.1, 94.2, 99, 100.1, 102, 105.1, 105.3, 110.1, 112; 375/106, 111, 112, 117, 118, 119; 369/60

[56] References Cited

U.S. PATENT DOCUMENTS

| | | | |
|---|---|---|---|
| 4,791,652 | 12/1988 | McEachern et al. | 370/102 |
| 4,928,275 | 5/1990 | Moore | 370/102 |
| 5,030,951 | 7/1991 | Eda et al. | 370/102 |
| 5,052,025 | 9/1991 | Duff et al. | 375/118 |
| 5,067,126 | 11/1991 | Moore | 370/112 |
| 5,111,485 | 5/1992 | Serack | 370/102 |
| 5,132,970 | 7/1992 | Urbansky | 375/112 |
| 5,157,655 | 10/1992 | Hamlin, Jr. et al. | 370/94.2 |

Primary Examiner—Douglas W. Olms
Assistant Examiner—Alpus H. Hsu
Attorney, Agent, or Firm—Ware, Fressola, Van Der Sluys & Adolphson

[57] ABSTRACT

An asynchronous parallel data formatter for use in mapping low speed serial asynchronous data signals into a higher speed signal includes a set of latches that receive the data from an elastic store. A time domain multiplexer receives signals from the latches as well as signals from an adder is responsive to one or more signals indicative of a need to recirculate data that provides stuff control signals and a carry signal. A formatter receives signals output from the time domain multiplexer and provides stuff and control bits as needed to complete the payload signal. The present asynchronous parallel data formatter provides sequential data transfer of full data bytes into partial bytes using one clock and a single set of control circuitry.

4 Claims, 3 Drawing Sheets

ASYNCHRONOUS PARALLEL DATA FORMATTER

TECHNICAL FIELD

This invention relates generally to the field of digital data equipment, and more particularly to asynchronous data formatting apparatus.

BACKGROUND OF THE INVENTION

Digital devices which are capable of asynchronous operation are well known in the art. Applications for such devices span a large range of digital signal processing equipment from printer (low speed)-computer (high speed) interfaces to digital data transmission systems where a low speed data stream is mapped into a high speed data transmission signal. An example of the latter is a digital formatter for mapping a digital signal into one having a SONET format.

With known formatters, full data bytes in the digital signal are divided into partial bytes by taking sequential serial data, and dividing it into the appropriately sized bytes to be combined with control bits and stuff bits. The resulting data signal is comprised of 8-bit words plus an extra flag bit to indicate the beginning of a known data sequence. This data signal must be passed through an elastic store. Additional circuits are included on the output or "read" side of the store to detect the flag bit that locates the start of the data formatting sequence. These circuits must also add whatever additional data, stuff bytes and stuff bits that may be required by the synchronous payload. Thus, both sides share the same framing and data alignment information needed to create the correct payload. An example of the foregoing for serial information is found in U.S. Pat. Nos. 4,928,275 entitled "Synchronization of Asynchronous Data Signals". Related apparatus are disclosed in U.S. Pat. No. 5,052,025.

A major shortcoming with the above referenced formatter lies with the fact that two sets of payload tracking circuitry, e.g. formatting counters and circuits, are required on each side of the elastic store. This adds unneeded complexity. The most common method of linking the circuitry on both sides is to send a flag bit through the elastic store with the data. The elastic store then requires an extra bit of width for all handshaking signals to pass through in the correct alignment with the data. Therefore, a 9-bit wide store must be used instead of an 8-bit wide store, resulting in an elastic store wider than it otherwise would have to be.

Another problem with known data formatters is their inability to map the data signal payload in a specific manner (i.e., a specific location in the higher speed signal frame) since the propagation time through the elastic store varies and is therefor unknown. Moreover, a brute force method of alignment would require more time in the form of many extra gates to implement. Consequently, the "write" side of the elastic store will typically originate the data formatting process with known apparatus.

Any digital system where a low speed, continuous data stream is mapped into a higher speed signal will require extra stuff bits and control bits that instruct the receiving device how to extract the payload. SONET compatible equipment has a fixed payload size but varying rates at which asynchronous data can be mapped into the payload. Therefore, the stuff bits and control bits used to fill up the payload must be supplied on both sides of the elastic store. It would be advantageous to have an apparatus that allows sequential data transfer of full data bytes into partial bytes using a one clock signal and a single assembly of control circuitry. The present invention is drawn towards such an apparatus.

SUMMARY OF INVENTION

An object of the present invention is to provide an apparatus for use in formatting asynchronous digital signals from a first low speed signal format to a second higher speed data format.

Another object of the present invention is to provide an asynchronous parallel data formatting apparatus of the forgoing type characterized by a single set of payload tracking circuitry.

Still another object of the present invention is to provide an asynchronous parallel data formatting apparatus of the forgoing type that has an elastic store whose width does not exceed the width of the data signal passed therethrough.

According to the present invention, a method of mapping asynchronous serial data signals in a first signal format into a second signal format having a data frame includes the steps of providing a read control signal and elastically storing received serial data signals of N-bits in width in a first signal format in N-bit wide bytes. Elastically stored output signals synchronized to said second signal format are presented in response to an elastic store read signal and latch output signals are generated having bytes of selected byte width less than or equal to N. The method also includes the steps of presenting a carry signal, time domain multiplexing received latch output signals with stuff bit signals, configuring the elastic read signal to be the logical "OR" of said carry signal and the read control signal as well as combining received multiplexer output signals with stuff control bit signals to completely map the serial data signals into the second signal data frame.

DESCRIPTION OF THE PREFERED EMBODIMENT

Figure 1:
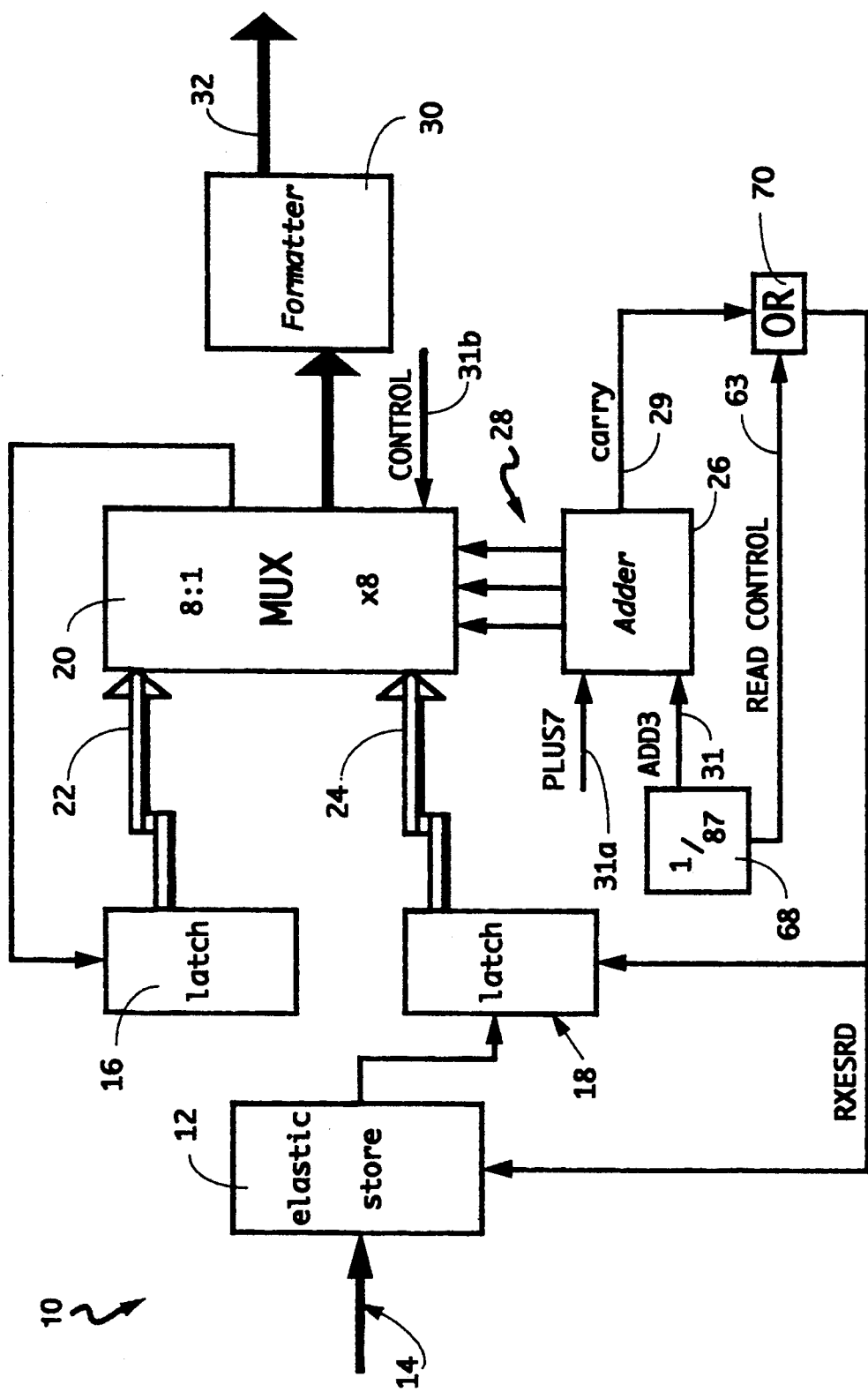
FIG. 1 is a simplified schematic illustration of an asynchronous parallel data formatter provided by the present invention.

Referring now to FIG. 1, there is shown in simplified schematic form an asynchronous parallel data formatter 10 provided by the present invention. The preferred asynchronous parallel data formatter is adapted for use in mapping received digital signals into a SONET format and includes an elastic store or cyclic buffer 12 configured in a known manner. The elastic store receives a data signal in serial form on line 14. The serial data signal is divided into 8-bit bytes and is written into the elastic store, also of 8-bit width.

Latch 18 receives the incoming data signals. The width of the latches is a function of the width of the data being processed. If N-bit wide words are being input to the formatter, then N input latches are required. Latch 16 stores a remainder up to N-1 bits wide. This allows the multiplexer 20 to add a full N-bit word to be added to a N-1 remainder. If a partial byte is required and N or more bits remain, then a new word is not read from the elastic store. The latches comprise part of an extraction device as detailed in the co-pending application U.S. Ser. No. 07/807,704 entitled "N Bit Parallel Input to Variable -Bit Parallel Output Shift Register" and incorporated herein by reference.

Multiplexer 20 is a conventional time domain unit adapted for the present application that receives the signals output from the latches on lines 22 and 24. Adder 26 controls multiplexer 20 in providing for stuff bits by means of control signal lines 28 as well as a "carry" signal on line 29 logically combined ("OR") at OR circuitry 70 with a read control signal on a line 63 as set forth hereinafter. The appropriate stuff and control bits are then provided by the multiplexer output signal to formatter 30 to complete the payload signal. Formatter 30 also controls the output of the payload signal provided on line 32. Thus, the output of the circuit 20 is immediately input to a multiplexer which shifts the information (I) bits to the proper locations, inserts zero for the R (fixed stuff) bits and 0 (overhead communications channel) bits, and sets the C (stuff control) bits to the proper value.

The present asynchronous parallel data formatter 10 was developed to allow sequential data transfer of full data bytes into partial bytes using just one clock signal and a single set of control logic circuitry. Eight bit data from the elastic store is reconfigured into 5 bit or 8 bit form with an occasional stuff bit provided as required to form the payload signal, DS3 formatted into a STS-1 frame in the preferred embodiment. Since all the signal formatting is done on the synchronous side of the store, the payload can be forced into any frame alignment required. The DS312 implementation consists of an elastic store, an eight bit parallel input to variable bit parallel output shift register, and a stuff control block (not shown). These blocks represent the physical realization of the concept.

Figure 2:
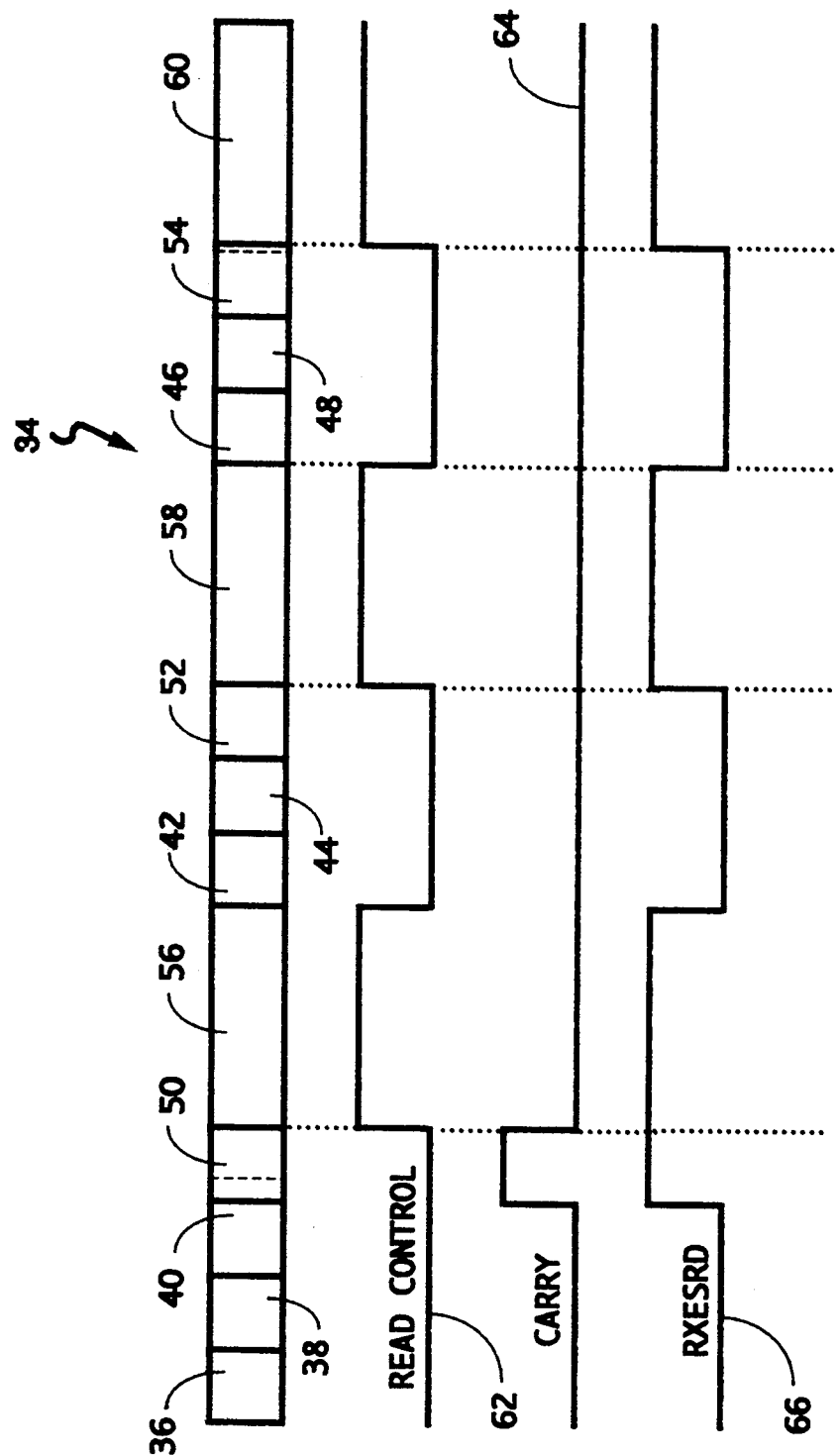
FIG. 2 is a diagrammatic illustration of the timing between various signals generated by the asynchronous parallel data formatter of FIG. 1.

FIG. 2 is a diagrammatic illustration of the timing between various signals generated by the asynchronous parallel data formatter of FIG. 1. Shown at 34 generally is schematic illustration of a row of a subframe of a synchronous payload envelope (SPE) in the STS-1 data format. Details on this as well as other standardized formats for data transmission for SONET are found in several sources, including "Digital Hierarchy-Optical Interface Rates and Formats Specifications" provided by the American National Standards Institute (ANSI). See also "TR253 SONET Transport Systems Common Generic Criteria", TR-TSY-000253, Issue Sep. 1, 1989 and TA-NWT-000253, Issue Sep. 6, 1990 as published by Bellcore. Each STS-1 frame comprises 90 columns and 9 rows of 8-bit bytes. Transport overhead accounts for 3 columns, leaving 87 columns shown in the figure. Path overhead is found at byte 36, while bytes 38, 40, 42, 44, 46 and 48 correspoond to fixed stuff bits. Byte 50 includes two fixed stuff bits and one stuff control bit. Byte 52 includes two stuff control bits and six fixed stuff bits. Byte 54 comprises fixed and stuff control bits, reserved overhead bits and a stuff opportunity bit. Bytes 56, 58 and 60 as well as 5 bits of byte 50 correspond to the data signal.

Waveform 62 corresponds to the read control signal on a line 63 from a divide by 87 row counter. Waveform 64 corresponds to the carry signal output on line 29. Waveform 66 corresponds to an elastic storage read signal (RXESRD) on a line 22 that is the logical "OR" of the carry and read control signal. The RXESRD signal on the line 72 controls a read counter in the elastic store 12 which generates the read address for the elastic store. When this signal is inactive, the read counter increments the read address every cycle and the multiplexer 20 is provided with new information bits on the signal line 24. The relative timing of the above signals is as shown in FIG. 2. As configured above, the present formatter avoids the need to supply stuff and control bits on both sides of the elastic store and therefore obviates the need for additional circuitry.

Figure 3:
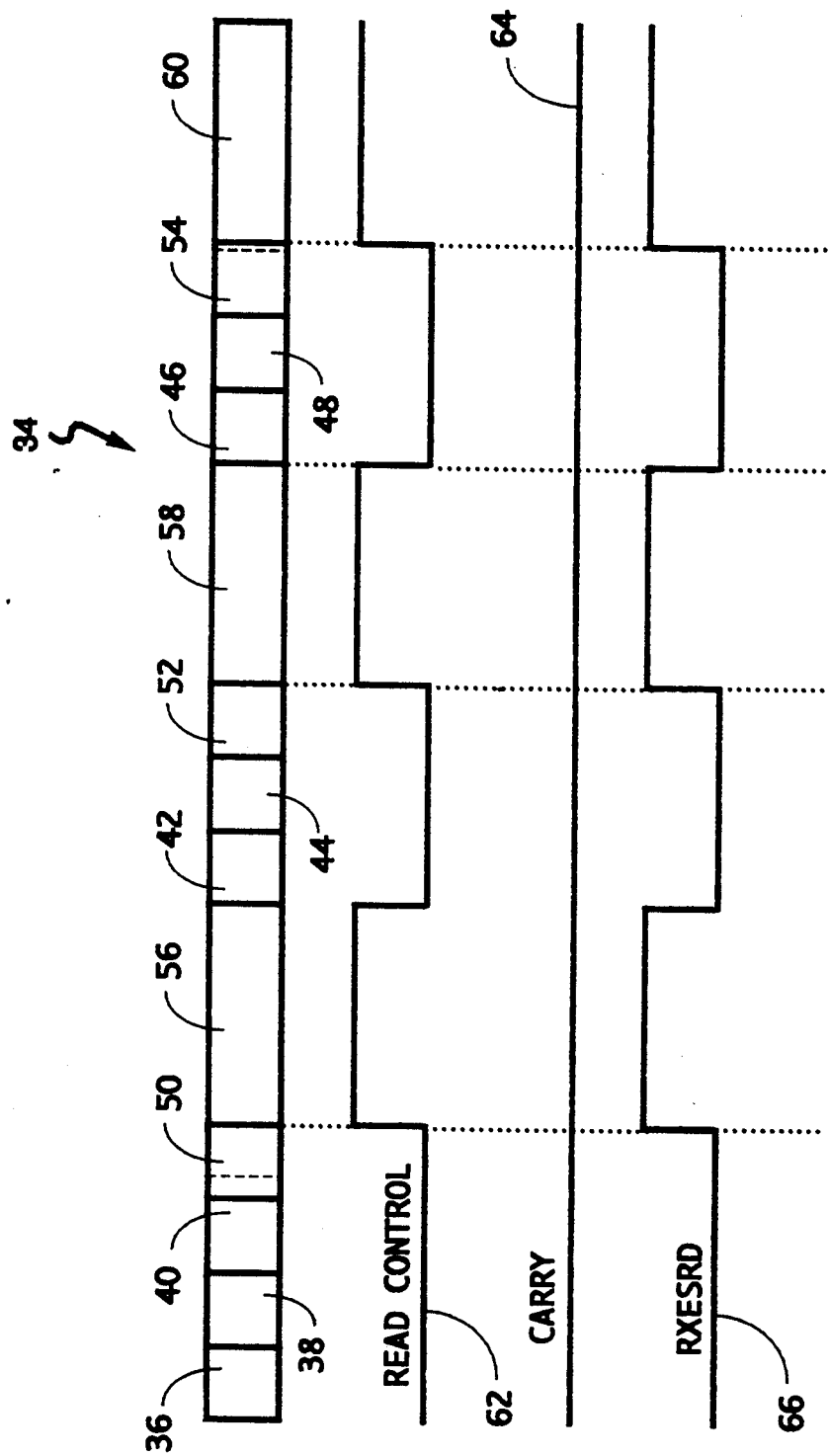
FIG. 3 is a diagrammatic illustration of the timing signals of FIG. 2 for the instance where remainder bits in the data signal exceed a threshold value.

FIG. 3 is a diagrammatic illustration of the timing signals of FIG. 2 for the instance where remainder bits in the data signal exceed a threshold value. When the number of bits in the remainder equals or exceeds 5, the carry signal on the line 29, as shown by waveform 64, will remain low, and the elastic storage read signal Waveform 66 will change accordingly. That is when there is a 5, 6 or 7 bit remainder, then the carry signal remains low as no data is needed in latch 18 if a partial byte is called for by formatter 30.

For clarification, the select lines 28 in FIG. 1, for one implementation, is the output of a three bit adder which has two fixed addition values, 3 and 7. Thus, the value on the select line 28 is equal to the number of bits being recirculated. Therefore, during column 4 when three additional bits are required to be recirculated, three is added to the current value in the adder. Similarly, during column 61 when a single information (I) bit is output by the shift register 20, seven is added to the current value in the adder 26. So, the select line 28 is incremented by three during this column by means of an ADD3 signal on a line 31 as provided by a divide by 87 circuit 68 to be discussed below. A PLUS7 signal on a line 31A is generated by the logical AND of a signal (not shown) identifying column 61 and the inverse of a control signal on a line 31B to enable the multiplexer during column 61 when one I bit is to be output.

The divide by 87 circuit 68 is a synchronous payload envelope (SPE) pattern generator. The SPE column locations are decoded from the divide by 87 counter output on the line 63. This may represent a plurality of control signals which result in the read control signal on the line 63 as described in the above cited copending application. The SPE pattern generator 68 is driven by a frame generator (not shown) which allows the SPE pattern to start at a known location in a frame. The frame generator may be a divide by 90 counter which determines the location of the transport overhead (TOH) by generating an elastic store read (ESRD) signal (not shown). The ESRD signal is active for 87 clock cycles and inactive for 3 clock cycles. When ESRD is inactive, all circuits controlling the read operation are held, i.e., the divide by 87 counter 68 is disabled and its count held, and the data in the latches 16, 18 is held. This action generates a 3 byte gap which will be the location for the transport overhead. Thus, the SPE pattern generator is "stretched" to cover 90 clock cycles by forcing it to hold its count for the 3 clock cycles that ESRD is inactive. Forcing it to hold its count and setting the divide by 87 counter to a known value will fix the SPE pattern to a known place within the frame.

Thus, the ESRD signal locates the transport overhead and allows the devices 16, 18, 20 to hold their current data, thus inserting gaps or stuff bits into the data signal. The other control signals within the group of signals 63 add similar gaps to the data.

Similarly, although the invention has been shown and described with respect to a preferred embodiment thereof, it would be understood by those skilled in the art that other various changes omissions and additions thereto maybe made without departing from the spirit and scope of the present invention. For example, the present invention can be readily adapted by one skilled in the art for use in formatting digital asynchronous signals to any of a number of signal formats, including:
DS1 to STS-1
DS3 to STS-1
CEPT-3 to STS-1
DS4NA to STS-3c
FDDI to STS-3c
CEPT-4 to STM-1.

Having described the invention, what is claimed is:

1. An apparatus for mapping asynchronous digital signals in a first signal format into a second signal format having a data frame, said apparatus comprising:
   a means (68) for providing a read control signal (63);
   an elastic store means (12) adapted to receive serial data signals (14) of N-bits in width in said first signal format for storing said serial data signals in N-bit wide bytes and presenting elastic store output signals synchronized with said second signal format in response to an elastic store read signal (72);
   a latch (16, 18) means for receiving said elastic store output signal and for presenting latch means output signals (22, 24) having bytes of selected byte width equal to N;
   an adder means (26), responsive to a plurality of signals (31, 31a) indicative of a need to provide stuff bits, for providing stuff bit control signals (28) and a carry signal (29);
   a time domain signal multiplexer means (20) responsive to said latch output signals (22, 24) and said stuff bit control signals (28) for providing multiplexer output signals synchronized to said second signal format; and
   logic means (70), responsive to said carry signal (29) and said read control signal (63), for providing said elastic store read signal (72).

2. The apparatus of claim 1 wherein said first signal format corresponds to DS1 and said second signal format corresponds to STS-1.

3. The apparatus of claim 1 wherein said first signal format comprises a member of the group consisting essentially of DS1, DS3, CEPT-3, DS4NA, FDDI and CEPT-4 and wherein said second data signal format comprises a member of the group consisting essentially of STS-1, STS-3c and STM-1.

4. A method of mapping asynchronous serial data signals in a first signal format into a second signal format having a data frame, said method comprising the steps of:
   elastically storing serial data signals of N-bits in width in said first signal format in N-bit wide bytes;
   providing a read control signal;
   presenting elastically stored output signals synchronized with said second signal format in response to an elastic store read signal;
   generating latch output signals having bytes of selected byte width equal to N;
   presenting a carry signal and stuff bit control signals in response to one or more signals indicative of a need to provide stuff bits;
   time domain multiplexing said latch output signals for providing multiplexed output signals in response to said stuff bit control signals; and
   configuring said elastic store read signal to be the logical "OR" of said carry signal and said read control signal.

* * * * *